United States Patent [19]

Benoit

[11] Patent Number: 4,571,235

[45] Date of Patent: Feb. 18, 1986

[54] METHODS FOR PREPARING FLAT-BOTTOM THERMOPLASTIC SACK AND SYSTEMS THEREFORE

[75] Inventor: Gordon L. Benoit, Macedon, N.Y.

[73] Assignee: Mobil Oil Corporation, New York, N.Y.

[21] Appl. No.: 746,924

[22] Filed: Jun. 19, 1985

Related U.S. Application Data

[63] Continuation of Ser. No. 606,319, May 2, 1984, abandoned.

[51] Int. Cl.[4] ....................... B31B 37/14; B31B 37/60; B32B 31/00

[52] U.S. Cl. .................................... 493/195; 156/204; 156/251; 156/253; 156/264; 156/461; 156/515; 493/203; 493/239

[58] Field of Search ............... 156/204, 251, 264, 253, 156/300, 290, 515, 461; 493/193, 194, 195, 196, 197, 203, 231, 232, 239, 936, 244, 189; 383/8, 121, 123, 124, 120

[56] References Cited

U.S. PATENT DOCUMENTS

| | | | |
|---|---|---|---|
| 277,153 | 5/1883 | Onderdonk . | |
| 2,432,122 | 12/1947 | Pardee . | |
| 2,673,024 | 3/1954 | Kuss . | |
| 3,119,548 | 6/1964 | Cook et al. . | |
| 3,549,451 | 3/1966 | Kugler . | |
| 3,853,664 | 12/1974 | Lafleur | 156/515 |
| 3,857,329 | 12/1974 | Lehmacher et al. | 493/203 |
| 3,966,524 | 6/1976 | Lehmacher | 383/8 |

FOREIGN PATENT DOCUMENTS

| | | | |
|---|---|---|---|
| 1055074 | 4/1952 | France . | |
| 1010094 | 4/1962 | United Kingdom . | |
| 1275399 | 5/1972 | United Kingdom | 383/121 |

*Primary Examiner*—Michael Ball
*Attorney, Agent, or Firm*—Alexander J. McKillop; Michael G. Gilman; James P. O'Sullivan

[57] ABSTRACT

A method and system for preparing flat bottom thermoplastic sacks comprising process steps and means for forming a tube of thermoplastic film, collapsing said tube while forming two oppositely disposed gussets therein, simultaneously or spatially sequentially opening a gusset fold on each side of said collapsed tube to their full, lay-flat extent; simultaneously or spatially sequentially forming in each of the four gusset folds, a diagonal sealed seam over the portions of the tube width corresponding to the gussets along lines diagonal to the length of the tube so that the ends of the sealed seams of adjacent gusset folds are at least closely spaced or in contact so as to form an angle of at least approximately 90°, returning said gusset folds to their original position so that their seal-pairs are superimposed, forming a transverse sealed seam across the tube along a line which includes the inboard ends of the diagonal seams and forming preweakened transverse lines closely adjacent to said transverse sealed seam or forming a severing line along this line; removing the four double triangular regions bounded by the diagonal seams, the transverse seam and the side edges of the tube; and collecting the resulting structures either while still interconnected or by stacking the severed sacks. The final structure can have handles or it can be handleless.

30 Claims, 2 Drawing Figures

METHODS FOR PREPARING FLAT-BOTTOM THERMOPLASTIC SACK AND SYSTEMS THEREFORE

This is a continuation of copending application Ser. No. 606,319, filed on May 2, 1984, now abandoned.

The present invention relates to methods and systems for preparing a thermoplastic sack, and, more particularly, to methods and systems for preparing such a sack having at least a substantially flat rectangular bottom. One type of bag contemplated for preparation by a system and process of the present invention is more particularly defined in copending U.S. patent application Ser. No. 06/606,120 filed May 2, 1984, the disclosure of which is in its entirety incorporated by reference herein.

The bag structure of said patent application is of a thermoplastic film material and it comprises front and rear bag walls connected by gusseted side walls. The bag has an open mouth top portion, which is characterized by having handles located at opposite end regions thereof, said handles each being of two films as a result of being integral extensions of said front, rear and gusseted side walls. The bag has a bottom wall planarly extensible so as to form a rectangle with at least no substantial excess film outside of the bulk volumetic capacity of the bottom region of said bag. An alternative manner of describing the bottom of such a bag is that said bottom is formed from integral extensions of said front, rear and side walls and the closure thereof is 4 two-film gusset-to-wall heat seals, when said bottom is a square, and 4 two-film gusset-to-wall heat seals and 1 two-film front wall-to-back wall heat seals when said bottom is a rectangle. The present invention also contemplates forming the same type of bag without handles.

It is an object of the invention to present a process for the preparation of the above-defined flat bottom sack.

It is yet another object of the invention to present a process for the preparation of interconnected severable flat-bottomed grocery sacks.

It is still another object of the present invention to present processes of forming flat bottomed thermoplastic film sacks not having handles.

It is yet another object of the invention to present a process for preparing flat bottomed handled sacks in bag pack form.

A further object of the present invention is to present novel systems for the preparation of such thermoplastic film flat bottom sacks.

SUMMARY OF THE INVENTION

The present invention is concerned with the method for preparing a handled, at least substantially flat, rectangular bottom, thermoplastic film sack comprising:

(a) forming a tube of a thermoplastic film;

(b) collapsing said tube while simultaneously forming therein two, oppositely disposed, parallel gussets;

(c) opening, simultaneously or spatially sequentially, a gusset fold on each side of said collapsed tube, to their full lay-flat extent;

(d) simultaneously or spatially sequentially forming in each of the four gusset folds, a diagonal sealed seam over the portions of the tube width corresponding to the gussets along lines diagonal to the length of the tube so that the ends of the sealed seams of adjacent gusset folds are at least closely spaced or in contact so as to form an angle therebetween of at least approximately 90°;

(e) returning said gusset folds to their original position so that their seal-pairs are superimposed;

(f) forming a transverse seal and severing seam across and through said collapsed tube along a line which includes the inboard ends of said pairs of diagonal seams;

(g) collecting a plurality of the resulting structures in a stack;

(h) removing from each structure the four folded triangles of film located between the diagonal sealed seams and the transverse sealing and severing seams to complete the bottom of the sack; and (i) forming a pair of handles and sack mouth opening at the opposite end of said sack bottom. For a pack of such bags a tab member is an integral extension of the bag mouth opening and each tab member has a pre-weakened region, such as perforations therein, so that when all tabs are fastened together, individual bags may be detached from the tab structure.

The present invention is also concerned with a method for preparing a handleless, at least substantially flat rectangular bottom, thermoplastic film sack comprising:

(a) forming a tube of thermoplastic film;

(b) collapsing said tube while simultaneously forming therein two oppositely disposed, parallel, gussets;

(c) opening simultaneously or spatially sequentially, a gusset fold on each side of said collapsed tube to their full lay-flat extent;

(d) simultaneously or spatially sequentially forming in each of the four gusset folds, a diagonal sealed-seam over the portions of the tube width corresponding to the gussets along lines diagonal to the length of the tube so that the ends of the sealed seams of adjacent gusset folds are at least closely spaced or in contact so as to form an angle of at least approximately 90°;

(e) returning said gusset folds to their original position so that their seal-pairs are superimposed;

(f) forming a transverse sealed seam across said tube along a line which includes the inboard ends of said pairs of diagonal seams and simultaneously forming a pre-weakened transverse line closely adjacent and parallel to said tranverse sealed seam;

(g) removing the four double film triangular regions bounded by said diagonal seams, said transverse seams and the side edges of said tube; and (h) collecting the resulting structures while still interconnected at said pre-weakened transverse lines.

Another method according to the present invention involves continuously preparing a handleless, at least substantially flat, rectangular bottom, thermoplastic film sack comprising:

(a) forming a tube of thermoplastic film;

(b) collapsing said tube while simultaneously forming therein, two oppositely disposed, parallel, gussets;

(c) opening, simultaneously or spatially sequentially, a gusset fold on each side of said collapsed tube of their full, lay-flat extent;

(d) simultaneously or spatially sequentially forming in each of the four gusset folds, a diagonal sealed seam over the portions of the tube width corresponding to the gussets along lines diagonal to the length of the tube so that the ends of the sealed seams of adjacent gusset folds are at least closely spaced or in contact so as to form an angle therebetween of at least approximately 90°;

(e) returning said gusset folds to their original position so that their seal-pairs are superimposed;

(f) forming a transverse sealed seam across said tube along a line which includes the inboard ends of said pairs of diagonal seams and simultaneously severing said tube along a line parallel to said transverse sealed seam; and (g) removing the four double film triangular regions bounded by said diagonal seams, said transverse sever line and the side edges of said period.

DETAILED DESCRIPTION OF THE INVENTION

Figure 1:
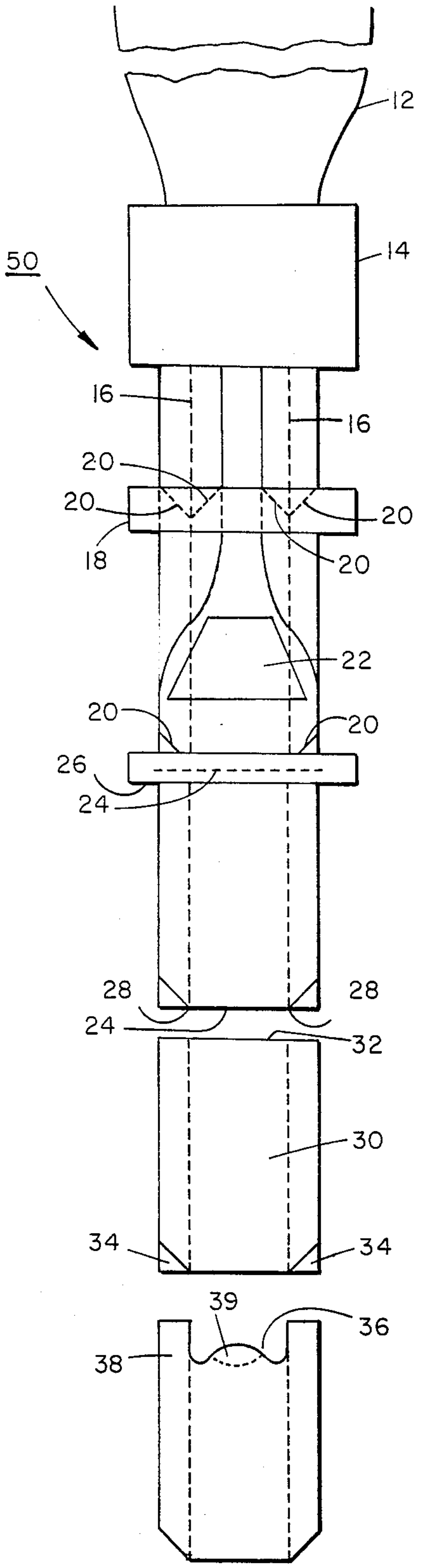
FIG. 1 is a plan view, in schematic form, illustrating a system and process sequence of one form of the present invention.

As shown in FIG. 1, there is illustrated a system and process sequence 50 for forming a handled, gusseted flat-bottomed thermoplastic sack. A hollow cylinder or tube of thermoplastic film 12 is in the process of being collapsed by being passed through a combined gusset forming and gusset opening means 14. This device can be of any construction which accomplishes the steps of collapsing the tube, forming oppositely disposed gussets therein and opening one fold of each gusset to the maximum so that they are spread open in a lay-flat position. By this is meant, that the gusset, which normally is folded upon itself at an acute angle approaching 0°, is opened by flipping or turning one of the folds over so that the gusset lays flat at an angle approaching 180°. Depending upon the size of the gussets, this step can be accomplished simultaneously. If both gussets are small enough, they can be opened completely side-by-side in a lay-flat position. As the gusset depth increases only one gusset fold can be opened at a time. As shown in FIG. 1, and as suggested by the mid-fold line 16, both gussets were opened completely by the gusset forming and opening means 14. In a situation where the gussets are too large to be able to be opened side-by-side, they can be opened spatially sequentially. By this is meant, first one gusset will be opened as the tube progresses means 14 and at a point downstream in the system, after the first gusset returns to its closed position, the opposite gusset will be opened by an equivalent means to the lay-flat position. As indicated above, device 14 can be a sheet-metal device which has an entrance side for receiving a flexible tube of cylindrical film. Sheet metal plates therein cause an infolding or gusset to be fashioned in the structure as the tube passes therethrough. The exit dimension progressively diminishes to present a fully collapsed gusseted tube. This device contains turning plates or rolls so that after the gusset is formed, the upper fold is progressively opened until it assumes a lay-flat, 180° position.

The gusset or gussets are opened so that a pair of diagonal sealed seams can be impressed in each of the four gusset folds as shown at 20. This is accomplished by means of a heat-sealing member 18 which includes Teflon-coated resistance wires heated to a temperature which will permit the two layers of each of the four gusset folds to be heat sealed together. The diagonal sealed seams extend over the portions of the tube width corresponding to the gussets along lines diagonal to the length of the tube. The seal-pairs of each gusset in the lay-flat position form an angle of approximately 90° to one another. Thereafter, a gusset closing device 22 flips or turns the open gusset and folds it back to the closed position so that the angle therebetween again approaches 0°. In this position the sealed seams 20 of each gusset are superimposed and in registration with one another.

As the collapsed tube with its seals 20 progress through the system, there subsequently is formed a bottom seal 24 which simultaneously seals and severs the bottom of the gusseted structure. This is accomplished by means of bottom sealing and severing device 26. Seal line 24 is a transverse sealing and severing seam which extends across and through the collapsed tube along a line which includes the inboard ends 28 of each pair of diagonal seams. Transverse sealing and severing device 26 can be any suitable means which will bond and sever the collapsed tube along the defined line. This sealing and severing action will isolate sack blank 30 from the collapsed and gusseted tube. Sack blank 30 will have a seal 32 across the top thereof and the four triangular regions 34 will be bounded by seal lines 20, 24 and the side edge of the gusseted structure.

The sack blank structures 30 may be separately or collectively converted into bag structures by removal of the triangular regions 34 and by the formation of bag mouth opening 36 which simultaneously forms handle loops 38, each of which are formed of two layers of film by virtue of the gusseted structure. This will complete the formation of a handled sack, the bottom of which can be planarly extended so as to have a flat bottom. By "planarly extended" is meant that the bag is extended in internal volume to its utmost by expanding the gussets fully, thereby forming a flat-bottom, rectangular in nature, having a length larger than its width.

In a preferred embodiment of the process and system illustrated in the drawing, a linear low density polyethylene tubular film 12, of about one mil in thickness, is collapsed and simultaneously gusseted with the gussets then opened fully to approximately 180° as the tube passes through the gusset forming and opening means 14. As the gusseted tube progresses through the system, seals 20 and 24 are simultaneously formed. This action produces bottom seal 24 and top seal 30 at the same time. This also isolates sack blank 30. Sack blank 30 can then be removed to a station which can separately or simultaneously remove triangular sections 34, form bag mouth opening 36 and form handles 38. This can be accomplished on individual blanks or alternatively, blank 30 can be stacked in vertical registration and, through the means of a suitable cutting die mechanism, the triangular regions removed and the handle and bag mouth opening can be formed.

Figure 2:
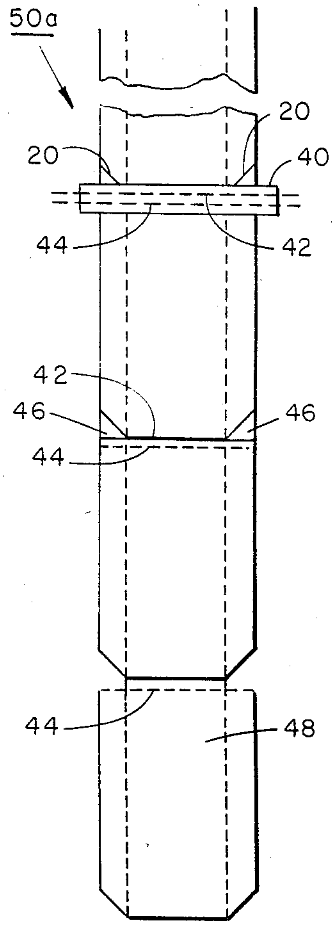
FIG. 2 is a plan view of another form of the process and system of the present invention.

For the formation of bags which do not contain a handle, the process and system is as shown in FIG. 2. The process and system 50*a* is different from that of FIG. 1, beginning at the point where the bottom of the bag is sealed. Thus, a bottom seal and perforating mechanism 40 is shown impressing seal-seam 42 in the flattened gusseted tube and, simultaneously therewith, perforation line 44 is formed closely adjacent and parallel to seal line 42. Seal line 42 does not sever the tube, merely seals it. Seal line 42 and perforation line 44 are impressed in the gusseted tube at the same time diagonal seals 20 are impressed into the opened gussets in the next succeeding gusseted tube structure. Thereafter, by any suitable die cutting mechanism, the four triangular regions 46 are removed from the structure. This will yield sack 48 attached by perforation line 44 to a like structure. Thereafter, these sacks may be rolled upon themselves to form a cylindrical package or collected in a zig-zag folded stack arrangement. Either structure will permit a sack to be torn free along the perforation lines to yield an open mouth bag which when extended fully to the total width of the gusset, will yield a flat-bottomed sack. Instead of rolling or folding this structure, each bag may be automatically separated at the perforation line and folded or stacked. The sack resulting from the process and system of FIG. 2 will have a rectangular bottom with a length larger than its width.

In a modification of the process and system shown in FIG. 2, open mouth handleless structures can be formed by forming a severance transversely across the tube at the same time bottom seal 42 is formed. Thereafter, the corners of the sack blank corresponding to regions 46 can be severed to complete the bag structure.

As disclosed, the bag structure formed by the system and process illustrated in FIGS. 1 and 2 will yield a sack having a rectangular bottom when planarly extended, which bottom will have a length longer than its width. In other words, the sack bottom will not be a square. In order to form a square bottom sack either with or without handles the process and means merely need be modified so that the gusset folds are both infolded to the maximum. That is, the collapsed tube will be gusseted to the longitudinal mid-line of the tube. In this case the center-fold of each gusset will contact the other and the angle between the thereafter formed diagonal seams will be at least about 90°. The resulting sack will then have a substantially flat square bottom when planarly extended.

Bags of the structures described can be formed with a pair of registered tabs as integral extensions of the bag mouth opening as shown at 39 in FIG. 1. The bags can be stacked in registration to contain 50, 100, 150, etc, bags and the tabs 39 fastened together in some suitable manner. For example, the tabs can be ultrasonically welded together. A perforation line across the tab will form a convenient tear-off site for individual bags to be removed from the bag pack.

Bags of the structures described can be formed by employing any suitable thermoplastic material, for example, polyolefins. In employing the term "polyolefins" it is used generically to include all forms of the polymer species, including, for example, low density polyethylene, linear low density copolymers of ethylene and another olefin, high density polyethylene, mixtures and blends of the same, and other monomer counterparts, etc. thermoplastic coated paper stock is also contemplated. The bag film can be of any gauge, for example, from about 0.3 to about 5 mils. in thickness.

In forming the flat-bottomed bag, it is preferred that the angle between the diagonal seal line and the bottom seal be at least approximately 135° when said bag is in its lay-flat condition. It is also preferred that the open mouth portion of the handled sacks of the present invention have stress relief curves or arcs extending from the base of the handle to a raised portion of the bag mouth. This will militate against splitting or tears occurring in the bag mouth during handle extension or when the bag is being filled with bulky material. The handles and bag mouth opening can have any configuration.

In forming the bag structure, the pertinent angles need not be precise. For example, they need not be exactly 90°, 45°, or 135°. Reasonable processing latitude should permit some deviation from these guidelines. Likewise in forming seal seams the ends thereof can be curved or angled in order to accommodate or insure good closure at all film interfaces and joints. Double or plural line seams and seals also can be employed.

What is claimed is:

1. A method of continuously preparing an at least substantially flat, rectangular-bottom thermoplastic film sack comprising:

(a) providing a flattened gusseted tube of thermoplastic film;
(b) opening a gusset fold on each side of said collapsed tube to their full lay-flat extent;
(c) forming in each of the four gusset folds, a diagonal sealed seam over the portions of the tube width corresponding to the gussets along lines diagonal to the length of the tube so that the ends of the sealed seams of adjacent gusset folds are at least closely spaced or in contact so as to form an angle of at least approximately 90°;
(d) returning said gusset folds to their original position so that their seal-pairs are superimposed;
(e) forming a transverse sealed seam across said tube along a line which includes the inboard ends of said pairs of diagonal seams;
(f) forming a pre-weakened transverse line closely adjacent and parallel to said transverse sealing seam;
(g) removing the four double film triangular regions bounded by said diagonal seams, said transverse seam and the side edges of said tube; and
(h) collecting the resulting structures while still interconnected at said preweakened transverse lines.

2. The method of claim 1 wherein said pre-weakened line is a line of perforations.

3. The method of claim 1 wherein said pre-weakened line is a line of reduced thickness.

4. The method of claim 1 wherein said resulting structures are collected in a roll.

5. The method of claim 1 wherein said resulting structures are collected in a zig-zag stack.

6. The method of claim 1 wherein the resulting interconnected structures are individually separated and folded or stacked.

7. The method of claim 1 wherein said thermoplastic film is of a polyolefin.

8. The method of claim 1 wherein each gusset is equal and the centerfold of each contacts the other, and where in step (b) the gusset folds on each side of said collapsed tube are spatially sequentially opened to their full lay-flat extent for sequential formation of the diagonal seals of step (c); and the angle between the seal pairs of step (d) is at least about 90° so the resulting sack has an at least substantially flat, square bottom when planarly extended.

9. The method of claim 1 wherein each gusset is equal and the centerfold of each gusset is spaced one from the other, and where in step (b) the gusset folds are simultaneously opened to their full lay-flat extent for simultaneous formation of the diagonal seals of step (c); and the angle between projected diagonal seam pairs of step (d) is at least 90° so that the resulting sack has an at least substantially flat, rectangular bottom of unequal dimensions when planarly extended.

10. The method of claim 1 wherein said pre-weakened transverse line is formed simultaneously with said transverse sealed seam.

11. The method of preparing an at least substantially flat rectangular bottom, thermoplastic film sack comprising;

(a) providing a flattened gussetted tube of thermoplastic film;

(b) opening a gusset fold on each side of said collapsed tube to their full lay-flat extent;

(c) forming in each of the four gusset folds, a diagonal sealed seam over the portions of the tube width corresponding to the gussets along lines diagonal to the length of the tube so that the ends of the sealed seams of adjacent folds are at least closely spaced or in contact so as to form an angle of at least approximately 90°;

(d) returning said gusset folds to their original position so that their seal-pairs are superimposed;

(e) forming a transverse sealing and severing seam across and through said collapsed tube along a line which includes the inboard ends of said pairs of diagonal seams;

(f) collecting the resulting structures in a stack;

(g) removing the four folded triangles of film between the diagonal sealed seams and the transverse sealing and severing seam to complete the bottom of the sack; and (h) forming handles and a sack mouth opening at the opposite end of said sack bottom.

12. The method of claim 11 wherein said two pairs of diagonal sealed seams and said transverse sealing and severing seams are formed simultaneously on adjacent sack structures.

13. The method of claim 11 wherein each gusset is equal and the center fold of each contacts the other, and where in step (b) the gusset folds on each side of said collapsed tube are spatially, sequentially opened to their full lay-flat extent for sequential formation of the diagonal seals of step (c); and the angle between the seal pairs of step (d) is at least about 90° so that the resulting sack has an at least substantially flat, square bottom when planarly extended.

14. The method of claim 11 wherein each gusset is equal and the centerfold of each gusset is spaced one from the other, and where in step (b) the gusset folds are simulteneously opened to their full lay-flat extent for simultaneous formation of the diagonal seals of step (c); and the angle between projected diagonal seam pairs of step (d) is at least 90° so that the resulting sack has an at least substantially flat, rectangular bottom of unequal dimensions when planarly extended.

15. A method of continuously preparing an at least substantially flat, rectangular-bottom, thermoplastic bag comprising:

(a) forming a tube of thermoplastic film;

(b) collapsing said tube while simultaneously forming therein two oppositely disposed, parallel, gussets;

(c) opening, simultaneously or spatially sequentially, a gusset fold on each side of said collapsed tube to their full lay-flat extent;

(d) simultaneously or spatially sequentially forming in each of the four gusset folds, a diagonal sealed seam over the portions of the tube width corresponding to the gussets along lines diagonal to the length of the tube so that the ends of the sealed seams of adjacent gusset folds are at least closely spaced or contact so as to form an angle of at least 90°;

(e) returning said gusset folds to their original position so that their seal-pairs are superimposed;

(f) forming a transverse sealed seam across said tube along a line which includes the inboard ends of said pairs of diagonal seams and simultaneously severing said collapsed tube along a line closely adjacent to said transverse sealed seams;

(g) removing the four double film triangular regions bounded by said diagonal seams, said transverse seam and the side edges of said tube.

16. The method of claim 15 wherein the sealed and severed structures are collected in a stack and then said four double film triangular regions are removed from said stack simultaneously.

17. The method of claim 16 wherein said rectangular-bottom is a square.

18. The method of claim 16 wherein said rectangular-bottom has an unequal length and width dimension.

19. A method of continuously preparing an at least substantially flat, rectangular-bottom, thermoplastic film sack comprising:

(a) forming a tube of thermoplastic film;

(b) collapsing said tube while simultaneously forming therein two oppositely disposed, parallel gussets;

(c) opening simultaneously or spatially sequentially, a gusset fold on each side of said collapsed tube to their full lay-flat extent;

(d) simultaneously or spatially sequentially forming in each of the four gusset folds, a diagonal sealed seam over the portions of the tube width corresponding to the gussets along lines diagonal to the length of the tube so that the ends of the sealed seams of adjacent gusset folds are at least closely spaced or in contact so as to form an angle of at least approximately 90°;

(e) returning said gusset folds to their original position so that their seal-pairs are superimposed;

(f) forming a transverse sealed seam across said tube along a line which includes the inboard ends of said pairs of diagonal seams and simultaneouly forming a preweakened transverse line closely adjacent and parallel to said transverse sealed seam;

(g) collecting the resulting structure in a stack so that all of said diagonal seams are at one end of said stack; and (h) removing the four double film triangular regions bounded by said diagonal seams, said transverse seam and the side edges of said tube.

20. The method of claim 19 wherein said structures are interconnected as stacked.

21. The method of claim 19 wherein said structures are separated at said preweakened line prior to stacking.

22. A method of continuously preparing an at least substantially flat, rectangular-bottom, thermoplastic film sack comprising:

(a) forming a tube of thermoplastic film (b) collapsing said tube while simultaneously forming therein two oppositely disposed, parallel gussets;

(c) opening, simultaneously or spatially sequentially, a gusset fold on each side of said collapsed tube to their full lay-flat extent;

(d) simultaneously or spatially sequentially forming in each of the four gusset folds, a diagonal sealed seam over the portions of the tube width corresponding to the gussets along lines diagonal to the length of the tube so that the ends of the sealed seams of adjacent gusset folds are at least closely spaced or in contact so as to form an angle of at least approximately 90°;

(e) returning said gusset folds to their original position so that their seal-pairs are superimposed;

(f) forming a transverse sealed seam across said tube along a line which includes the inboard ends of said pairs of diagonal seams and simultaneously forming a preweakened transverse line closely adjacent and parallel to said transverse sealed seam and a second transverse sealed seam across said tube closely adjacent and parallel to said preweakened line;

(g) collecting the resulting structure in a stack so that all of said diagonal seams are at one end of said stack; and (h) removing the four double film triangular regions bounded by said diagonal seams, said transverse seam and the side edges of said tube; and (i) forming a handle and sack mouth opening at the opposite end of said sack bottom.

23. A system for preparing an at least substantially flat, rectangular-bottom, thermoplastic film sack comprising in combination:

(a) means for forming a tube of thermoplastic film;

(b) means for collapsing said tube including means for simultaneously forming therein two oppositely disposed, parallel, gussets;

(c) means for opening, simultaneously or spatially sequentially, a gusset fold on each side of said collapsed tube to their full, lay-flat extent;

(d) means for simultaneously or spatially sequentially forming in each of the four gusset folds a diagonal seam over the portion of the tube width corresponding to the gussets along lines diagonal to the length of the tube so that the ends of the sealed seams of adjacent gusset folds are at least closely spaced or in contact so as to form an angle of at least approximately 90°;

(e) means for returning said gusset folds to their original position so that their seal-pairs are superimposed;

(f) means for forming a transverse sealed seam across said tube along a line which includes the inboard ends of said pairs of diagonal seams and means for simultaneously forming a pre-weakened transverse line closely adjacent and parallel to said transverse sealed seams;

(g) means for removing four double film triangular regions bounded by said diagonal seams said transverse seam and the side edges of said tube; and (h) means for collecting the resulting structures while still interconnected at said pre-weakened transverse lines.

24. The system of claim 23 wherein said means for forming said diagonal sealed seams include non-stick means.

25. The system of claim 23 wherein said means for forming said pre-weakened transverse line is a perforating means.

26. The system of claim 23 wherein said means for removing said triangular regions is a cutting means.

27. The system of claim 23 wherein said means for collecting said interconnecting structure is a means for forming said structures into a roll.

28. The system of claim 23 wherein said collecting means is a means for collecting said structures in a zig-zag stack.

29. The system of claim 28 including means for forming severable tab members on opposite sides of said sack mouth opening and means for fastening said tabs together to form a pack of a plurality of sacks.

30. A system of continuously preparing an at least substantially flat, rectangular-bottom, thermoplastic film sack comprising in combination:

(a) means for providing a collapsed gusseted tube of thermoplastic film;

(b) means for opening a gusset fold on each side of said collapsed tube to their full lay-flat extent; means for forming in each of the four gusset folds, a diagonal sealed seam over the portions of the tube width corresponding to the gussets along lines diagonal to the length of the tube so that the ends of the sealed seams of adjacent gusset folds are at least closely spaced or in contact so as to form an angle of at least approximately 90°;

(c) means for returning said gusset folds to their original position so that their seal-pairs are superimposed;

(d) means for forming a transverse sealing and severing seam across and through said collapsed tube along a line which includes the inboard ends of said pairs of diagonal seams;

(e) means for collecting the resulting structures in a stack;

(f) means for removing the four folded triangles of film between the diagonal sealed seams and the transverse sealing and severing seam to complete the bottom of the sack; and (g) means for forming a pair of handles and a sack mouth opening at the opposite end of said sack bottom.

* * * * *